US007859547B2

(12) United States Patent
Chen et al.

(10) Patent No.: US 7,859,547 B2
(45) Date of Patent: Dec. 28, 2010

(54) DISPLAY PARAMETER ADJUSTING METHOD AND APPARATUS FOR SCENE CHANGE COMPENSATION

(75) Inventors: Shing-Chia Chen, Tainan County (TW); Ling-Hsiu Huang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 696 days.

(21) Appl. No.: 11/860,782

(22) Filed: Sep. 25, 2007

(65) Prior Publication Data

US 2009/0079754 A1 Mar. 26, 2009

(51) Int. Cl.

| | |
|---|---|
| ***G09G 5/00*** | (2006.01) |
| ***G09G 3/36*** | (2006.01) |
| ***G06K 9/32*** | (2006.01) |
| ***G06K 9/40*** | (2006.01) |
| ***G09K 9/36*** | (2006.01) |
| ***G06F 7/38*** | (2006.01) |
| ***H04N 5/57*** | (2006.01) |
| *H04N 7/12* | (2006.01) |
| *G06F 11/00* | (2006.01) |

(52) U.S. Cl. ....................... 345/581; 345/601; 345/618; 345/643; 345/102; 348/430; 348/602; 382/254; 382/274; 382/276; 382/300; 708/290; 708/490; 708/530

(58) Field of Classification Search ................. 345/581, 345/586, 601, 606, 616, 618–619, 639, 643, 345/547, 3.2, 77, 102; 348/430, 456, 538, 348/575, 602, 687; 382/254, 274, 276, 305, 382/300; 708/235, 290, 490, 505, 530, 670
See application file for complete search history.

(56) References Cited

U.S. PATENT DOCUMENTS

| | | | | |
|---|---|---|---|---|
| 2002/0048389 | A1 * | 4/2002 | Komaki | 382/107 |
| 2004/0201782 | A1 * | 10/2004 | Murai et al. | 348/700 |
| 2006/0245656 | A1 * | 11/2006 | Shinohara et al. | 382/236 |
| 2008/0186413 | A1 * | 8/2008 | Someya et al. | 348/739 |
| 2008/0198153 | A1 * | 8/2008 | Yu et al. | 345/214 |

* cited by examiner

*Primary Examiner*—Wesner Sajous
(74) *Attorney, Agent, or Firm*—J.C. Patents

(57) ABSTRACT

A method and an apparatus for adjusting a display parameter are provided. The method includes the steps of: (a) calculating a scene change value between a current frame and a previous frame; (b) setting a first weight according to the scene change value; (c) calculating an original parameter of the current frame; (d) providing a display parameter of the previous frame; (e) calculating a display parameter of the current frame according to the first weight, the original parameter, and the display parameter of the previous frame.

16 Claims, 6 Drawing Sheets

DISPLAY PARAMETER ADJUSTING METHOD AND APPARATUS FOR SCENE CHANGE COMPENSATION

BACKGROUND OF THE INVENTION

1. Field of Invention

The present invention relates to a display parameter adjusting method and apparatus, and more particularly relates to a display parameter adjusting method and apparatus for scene change compensation.

2. Description of Related Art

The development of LCD display apparatuses and media software makes many people watch high display quality TV programs and movies at home. Furthermore, when people play TV or PC games, the high display quality makes them feel the screen of LCD display is really genuine. The display apparatus has a plurality of parameters to adjust for compensating the next incoming frames, thus the change between the previous frame and the current frame with compensation will be smoother comparing to the change between the previous frame and the current frame without compensation.

In the conventional LCD display apparatus, a simple compensation method is applied on it. It only calculates all pixels of the current frame to acquire appropriate display parameters, and these display parameters will be passed to the next frame to achieve compensation. For example, the display parameters may be image brightness parameter, brightness gain parameter of dynamic backlight control and so on.

The method stated above is simple and easily to be implemented, but sometimes the current frame and previous frame are correlated, ex: two continuous frames with little difference, thus most LCD manufacturers consider the current and previous frame to acquire display parameters of the current frame.

FIG. 1 is a flow diagram showing a conventional display parameter adjusting method. In (Step S1-1), the original parameter of the current frame is calculated according to the pixels of the current frame. The calculation process may be calculating the mean of all pixels and acquiring the original parameter of the current frame according to the mean. In (Step S1-2), the display parameter of the previous frame is provided. In (Step S1-3), the display parameter of the current frame is calculated according to the original parameter of the current frame, the display parameter of the previous frame, and fixed weights. For example, the fixed weights for the original parameter of the current frame and the display parameter of the previous frame are ⅝ and ⅜ respectively, which are fixed. Thus if the original parameter of the current frame and the display parameter of the previous frame are 80 and 40 respectively, the display parameter of the current frame is 80*⅝+40*⅜=65.

FIG. 2 is a schematic diagram showing a conventional display parameter adjusting apparatus. This apparatus 20 comprises a parameter generating unit 200, a calculating unit 201, and a register 202. Wherein, the parameter generating unit 200 is coupled to the calculating unit 201, and the calculating unit 201 is coupled to the register 202. The parameter generating unit 200 is used for calculating the original parameter $P_{ori}$ of the current frame. The calculating unit 201 is used to receiving the original parameter $P_{ori}$ of the current frame and the display parameter $P'_{disp}$ of the previous frame, and providing the fixed weights to calculate the display parameter $P_{disp}$ of the current frame according to the original parameter $P_{ori}$ of the current frame, the display parameter $P'_{disp}$ of the previous frame, and the fixed weights. The register 202 is used for recording the display parameter $P'_{disp}$ of the previous frame. For example, the fixed weights for the original parameter $P_{ori}$ of the current frame and the display parameter $P'_{disp}$ of the previous frame are ⅝ and ⅜ respectively, which are fixed. Thus if the original parameter $P_{ori}$ of the current frame and the display parameter $P'_{disp}$ of the previous frame are 120 and 80 respectively, the display parameter $P_{disp}$ of the current frame is 120*⅝+80*⅜=105.

The stated conventional display parameter adjusting apparatus and method only use the fixed weights, the original parameter of the current frame, and the display parameter of the previous frame to adjust display parameter. In some case, the fixed weights may not make the frames smoother, such as the fixed weights ⅝ and ⅜ may not be suitable for fast scene change between the current frame and previous frame.

To make watchers watch the smoother frames on LCD display, LCD or other display apparatus manufactures make efforts in this field to solve the stated or other problems.

SUMMARY OF THE INVENTION

The invention provides a method for adjusting a display parameter to compensate the scene change, and the weights for the original parameter of the current frame and the display parameter of the previous frame are dynamic adjusted.

The invention provides an apparatus for adjusting a display parameter to compensate the scene change, and the weights for the original parameter of the current frame and the display parameter of the previous frame are dynamic adjusted.

The invention provides a method for adjusting a display parameter. The method comprises steps of: (a) calculating a scene change value between a current frame and a previous frame; (b) setting a first weight according to the scene change value; (c) calculating an original parameter of the current frame; (d) providing a display parameter of the previous frame; and (e) calculating a display parameter of the current frame according to the first weight, the original parameter, and the display parameter of the previous frame.

The invention provides an apparatus for adjusting a display parameter. The apparatus comprises a scene change detection unit, a weight unit, a parameter generating unit, a register and a calculating unit. Wherein, the weight unit is coupled to the scene change detection unit, and the calculating unit is coupled to the weight unit, the register and the parameter generating unit. The scene change detection unit is used for calculating a scene change value between a current frame and a previous frame. The weight unit is used for setting a first weight according to the scene change value. The parameter generating unit is used for calculating an original parameter of the current frame. The register is used for recording a display parameter of the previous frame. The calculating unit is used for calculating a display parameter of the current frame according to the first weight, the original parameter, and the display parameter of the previous frame.

The invention uses adaptive weights for compensating the fast-varying and slow-varying scene changes. Thus the LCD display which uses the apparatus and method provided by the invention will have smoother frames, so as to provide high display quality for TV or movie watchers and other customers.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
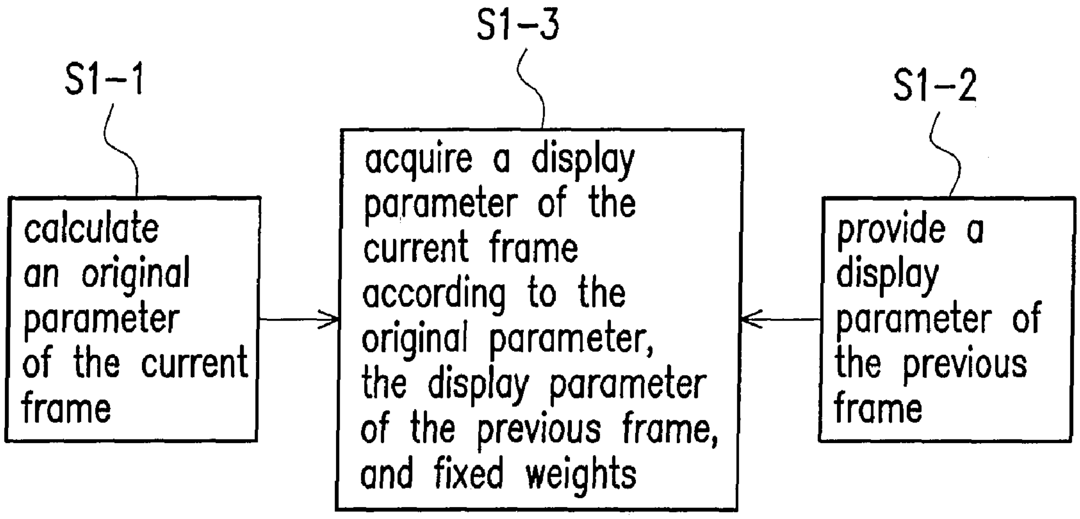
FIG. 1 (PRIOR ART)
FIG. 1 is a flow diagram showing a conventional display parameter adjusting method.
Figure 2:
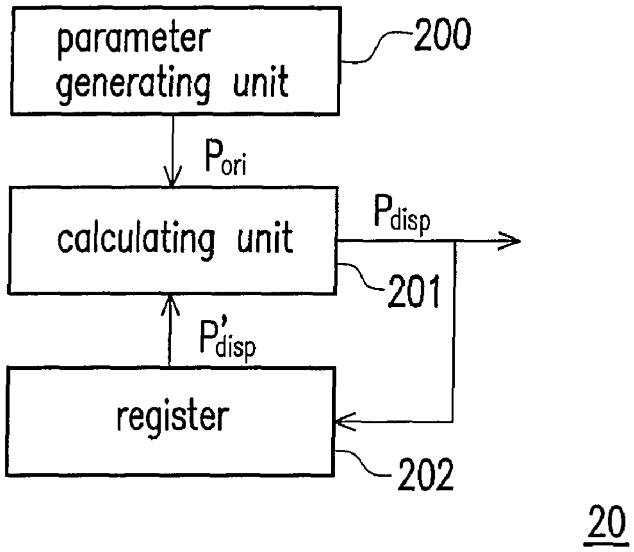
FIG. 2 (PRIOR ART)
FIG. 2 is a schematic diagram showing a conventional display parameter adjusting apparatus.

Reference will now be made in detail to the present embodiments of the invention, examples of which are illustrated in the accompanying drawings. Wherever possible, the same reference numbers are used in the drawings and the description to refer to the same or like parts.

In order to make the frames smoother, the invention provides a method for adjusting a display parameter. The weights between the original parameter of the current frame and the display parameter of the previous frame are dynamic.

Figure 3:
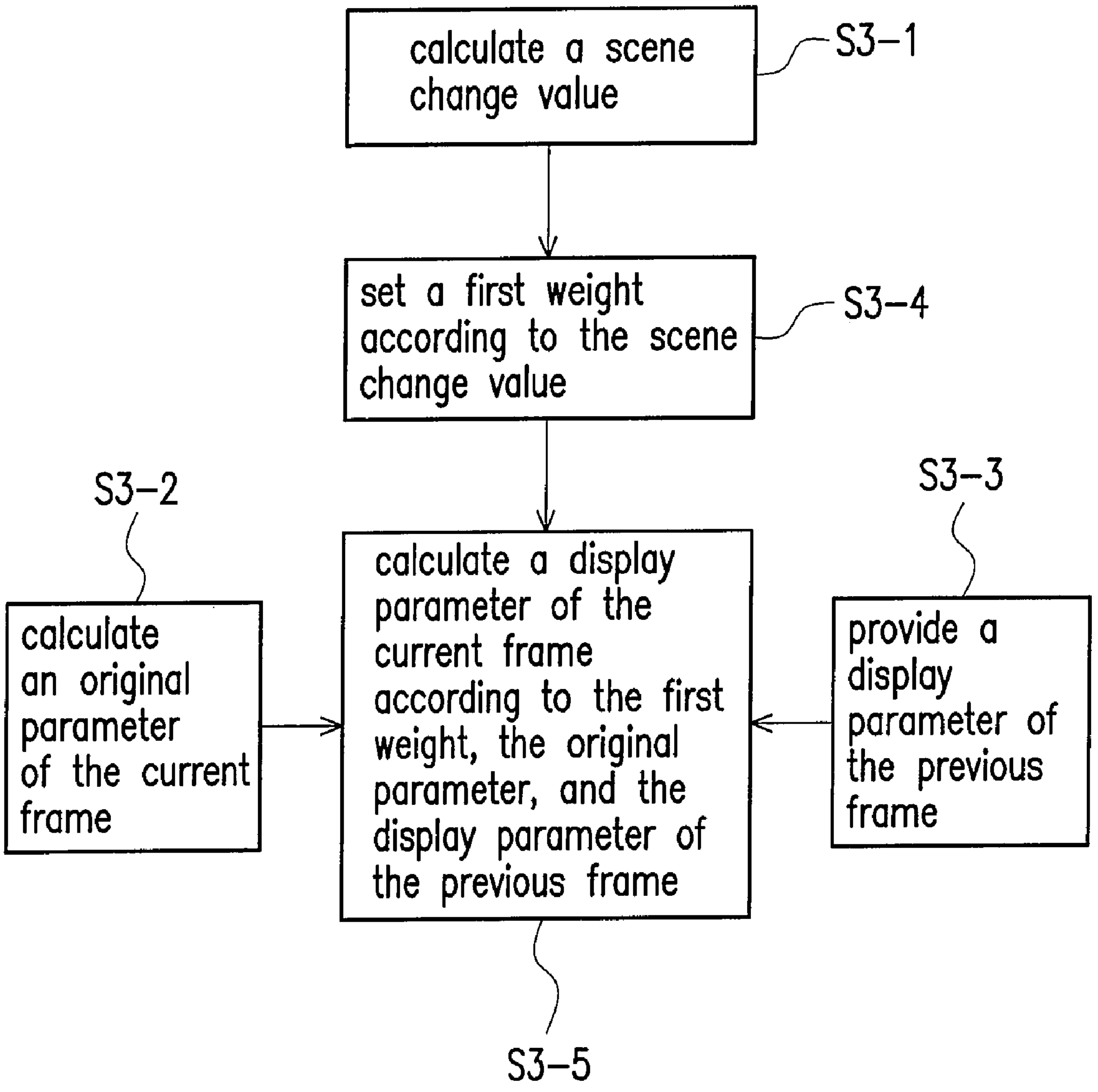
FIG. 3 is a flow diagram showing a method for adjusting a display parameter provided by the invention.

FIG. 3 is a flow diagram showing a method for adjusting a display parameter provided by the invention. In Step S3-1, a scene change value between a current frame and a previous frame is calculated first. In Step S3-2, an original parameter of the current frame is also calculated. In Step S3-3, a display parameter of the previous frame is provided. In Step S3-4, a first weight according to the scene change value is set. Finally in Step S3-5, a display parameter of the current frame is calculated according to the first weight, the original parameter, and the display parameter of the previous frame. The sequence of the previously described steps may be changed to S3-1, S3-3, S3-2, S3-4 and S3-5, and this embodiment is not to limit the scope of the invention.

Figure 4:
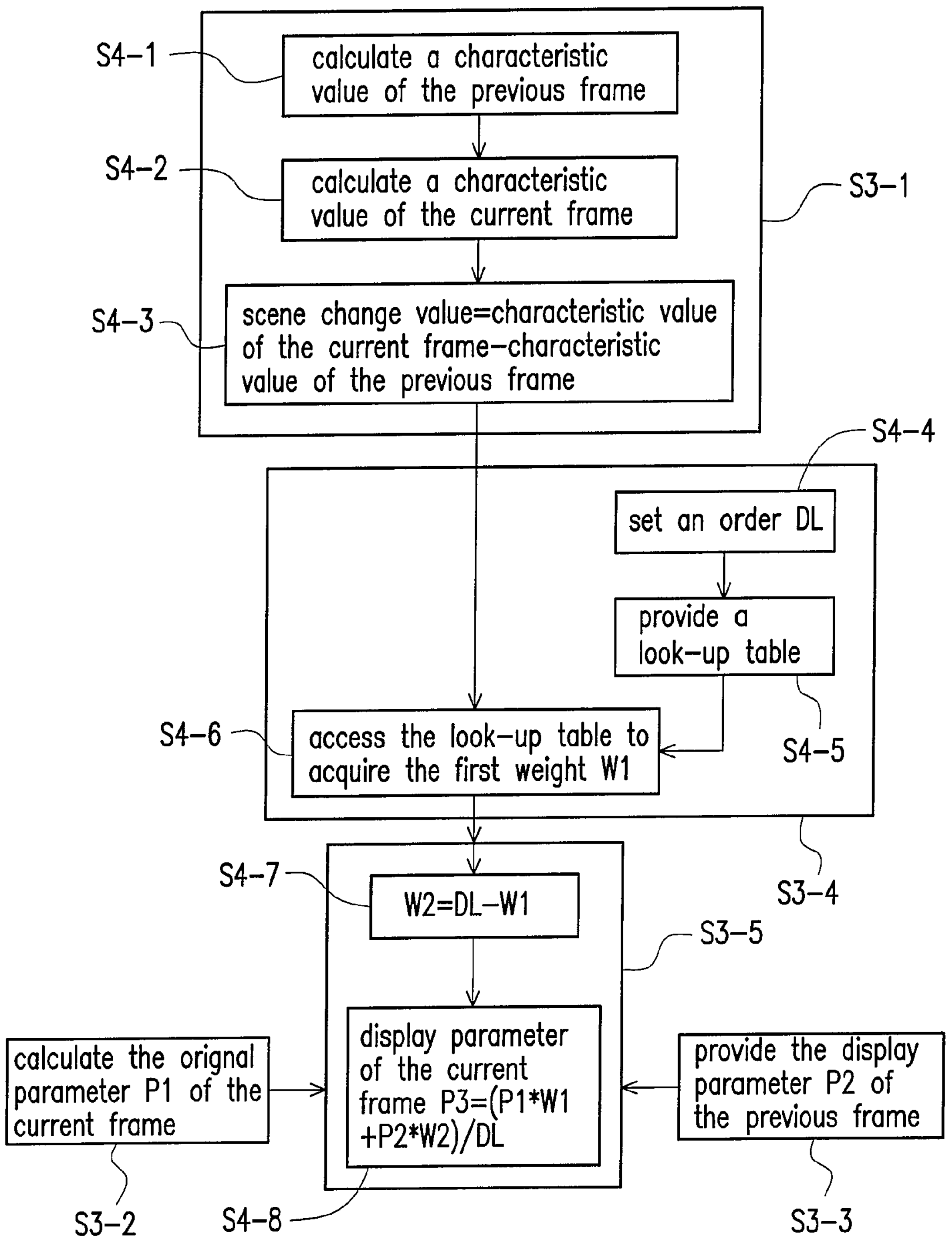
FIG. 4 is a flow diagram showing an embodiment of a method for adjusting a display parameter provided in FIG. 3.

FIG. 4 is a flow diagram showing an embodiment of a method for adjusting a display parameter provided in FIG. 3. In Step S3-1, the scene change value is obtained by executing Step S4-1~S4-3. This is one embodiment to calculate the scene change value, and it is not intended to limit the scope of the invention. In Step S4-1, a characteristic value of the previous frame is obtained by some calculation, such as calculating the average of all pixels of the previous frame. In Step S4-2, a characteristic value of the current frame is obtained by some calculation, such as calculating the average of all pixels of the current frame. In Step S4-3, the scene change value is calculated by subtracting the characteristic value of the previous frame from the characteristic value of the current frame.

In Step S3-4, the first weight can be obtained by executing Step S4-4~S4-6. This is one embodiment to set the first weight, and it is not intended to limit the scope of the invention. In Step S4-4, an order DL is set. In Step S4-5, a look-up table recording a relationship between the scene change value and the first weight W1 is provided. This look-up table may be selected from some preset look-up tables according to the order DL. In Step S4-6, the first weight W1 is acquired corresponding to the scene change value by accessing the look-up table. As stated above, people who are skilled in the field may set a first weight according to the scene change value with other implementation, but it is still in the scope of the invention.

In Step S3-5, the display parameter of the current frame can be calculated by executing Step S4-7 and S4-8. This is one embodiment to calculate the display parameter of the current frame, and it is not intended to limit the scope of the invention. In Step S4-7, a second weight W2 is generated first by subtracting the first weight W1 from the order DL (i.e. W2=DL−W1). In Step S4-8, the display parameter of the current frame is calculated as P3=(P1*W1+P2*W2)/DL, where, the display parameter of the current frame denotes P3, the original parameter of the current frame denotes P1, and the display parameter of the previous frame denotes P2.

In FIG. 3, the original parameter of the current frame may be calculated according to pixels of the current frame in Step S3-1. Furthermore, the original parameter and display parameters may be image brightness parameter, brightness gain parameter of dynamic backlight control and so on. In addition, this embodiment is not intended to limit the scope of the invention.

Figure 5:
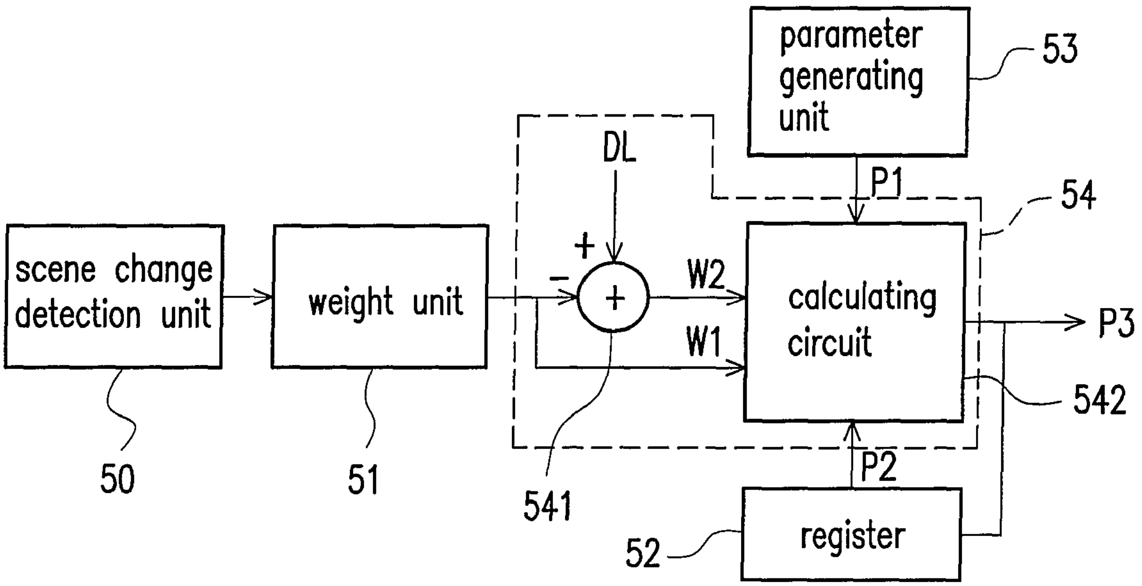
FIG. 5 is the schematic diagram showing an embodiment of an apparatus for adjusting a display parameter.

FIG. 5 is the schematic diagram showing an embodiment of an apparatus for adjusting a display parameter. The apparatus for adjusting a display parameter comprises a scene change detection unit 50, a weight unit 51, a parameter generating unit 53, a register 52 and a calculating unit 54. Wherein, the weight unit 51 is coupled to the scene change detection unit 50, and the calculating unit 54 is coupled to the weight unit 51, the register 52 and the parameter generating unit 53. The scene change detection unit 50 is used for calculating a scene change value between a current frame and a previous frame. The weight unit 51 is used for setting a first weight according to the scene change value. The parameter generating unit 53 is used for calculating an original parameter of the current frame. The register 52 is used for recording a display parameter of the previous frame. The calculating unit 54 is used for calculating a display parameter of the current frame according to the first weight, the original parameter, and the display parameter of the previous frame.

In one embodiment, the weight unit 51 has a look-up table recording a relationship between the scene change value and the first weight, and the weight unit 51 acquires the first weight corresponding to the scene change value by accessing the look-up table. In this embodiment, the calculating unit 54 further includes a subtractor 541 and a calculating circuit 542. The subtractor 541 is coupled to the calculating circuit 542 and weight unit 51. The calculating circuit 542 is coupled to the weight unit 51. The subtractor 541 is used for subtracting the first weight W1 from a preset order DL to generate a second weight W2 (i.e. W2=DL−W1). The calculating circuit 542 is used for calculating the display parameter of the current frame as P3=(P1*W1+P2*W2)/DL, where, the display parameter of the current frame denotes P3, the second weight denotes W2, the first weight denotes W1, a preset order denotes DL, the original parameter of the current frame denotes P1, and the display parameter of the previous frame denotes P2.

The scene change detection unit 50 calculates a characteristic value of the previous frame, such as the average of all pixels of the previous frame. The scene change detection unit 50 calculates a characteristic value of the current frame, such as the average of all pixels of the current frame. Then, the scene change detection unit 50 calculates a scene change value by subtracting the characteristic value of the previous frame from the characteristic value of the current frame. Furthermore, the original parameter and display parameters may be image brightness parameter, brightness gain parameter of dynamic backlight control and so on. In addition, this embodiment is not intended to limit the scope of the invention.

Figure 6:
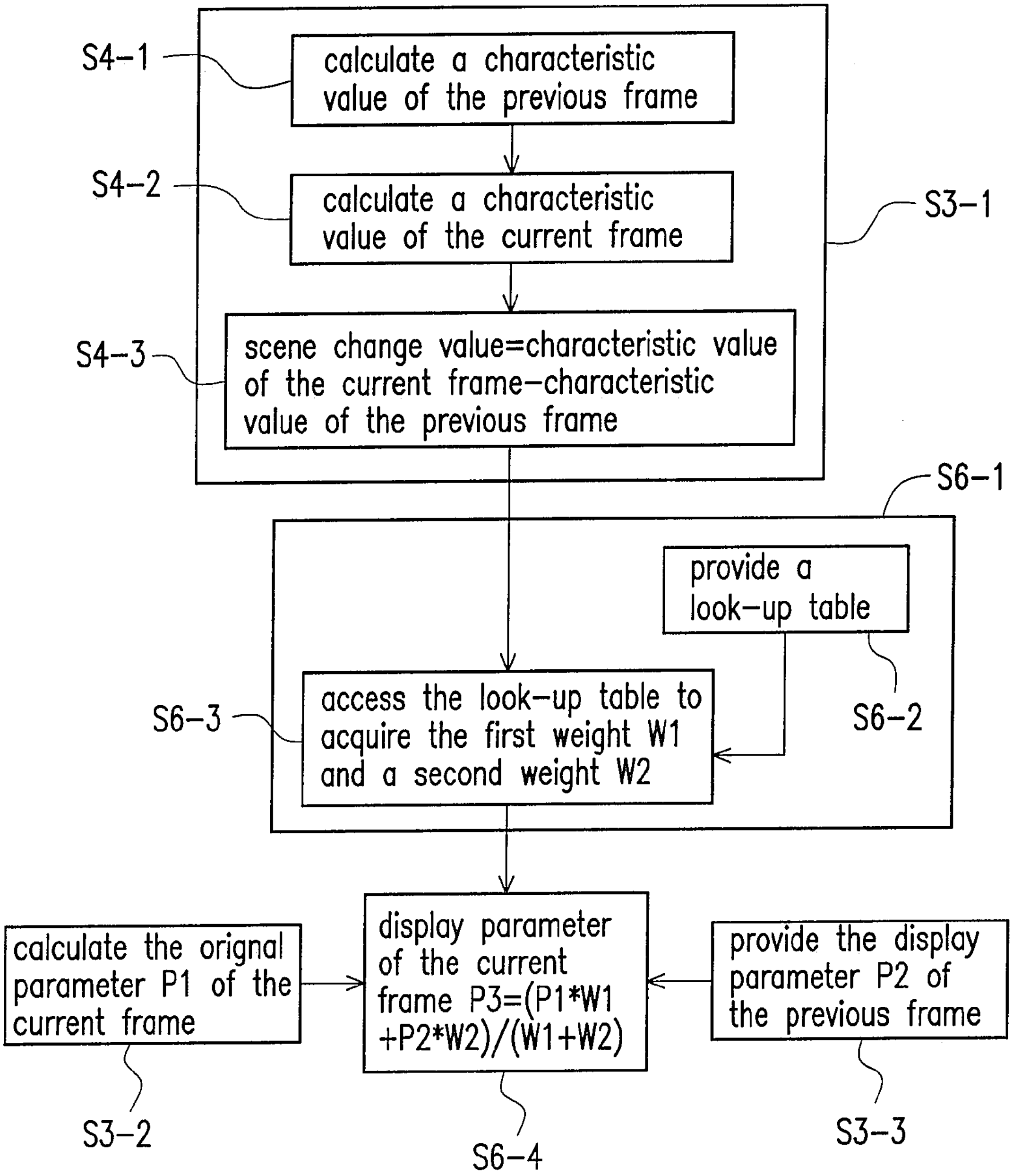
FIG. 6 is a flow diagram showing another one embodiment of a method for adjusting a display parameter provided in FIG. 3.

FIG. 6 is a flow diagram showing another one embodiment of a method for adjusting a display parameter provided in FIG. 3. The Steps S3-2, S3-3 and S4-1~S4-3 is described and stated as the foregoing. In Step S6-1, a first weight and second weight are set according to the scene change value. The detailed implementations are showed in Steps S6-2 and S6-3. In Step S6-2, a look-up table is provided. In Step S6-3, the first weight and the second weight are acquired by accessing the look-up table. In Step S6-4, the display parameter of the current frame is calculated as P3=(P1*W1+P2*W2)/(W1+W2), where, the display parameter of the current frame denotes P3, the second weight denotes W2, the first weight denotes W1, the original parameter of the current frame denotes P1, and the display parameter of the previous frame denotes P2.

Figure 7:
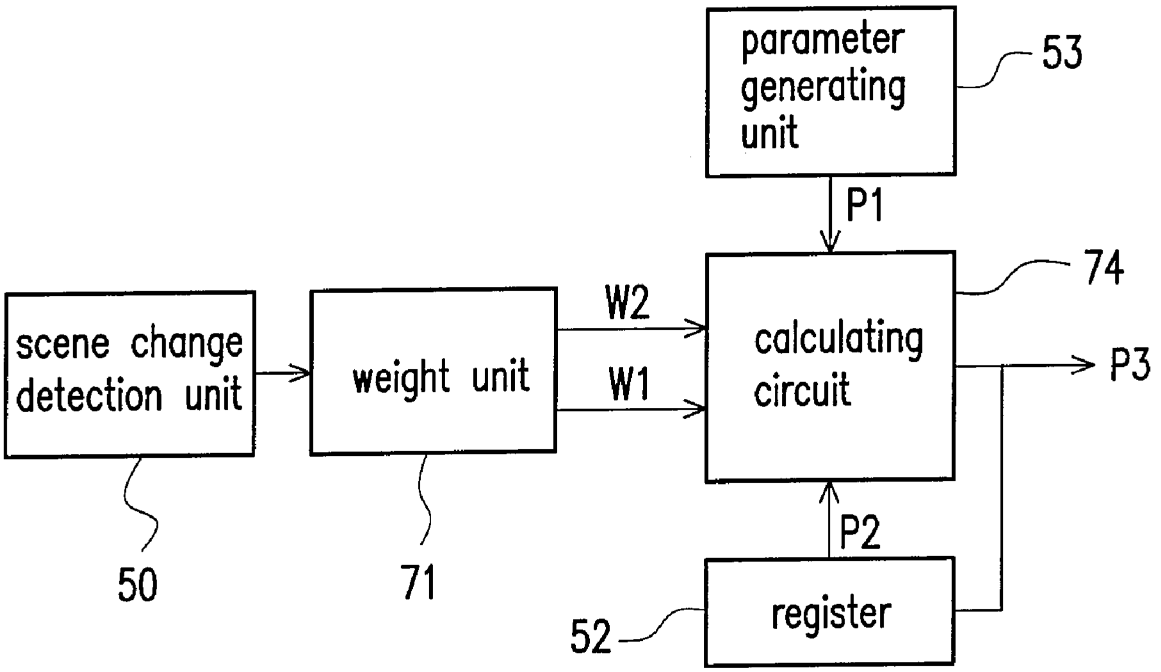
FIG. 7 is the schematic diagram showing another one embodiment of an apparatus for adjusting a display parameter.

FIG. 7 is the schematic diagram showing another one embodiment of an apparatus for adjusting a display parameter. The apparatus for adjusting a display parameter comprises a scene change detection unit 50, a weight unit 71, a parameter generating unit 53, a register 52 and a calculating unit 74. Wherein, the weight unit 71 is coupled to the scene change detection unit 50, and the calculating unit 74 is coupled to the weight unit 51, the register 52 and the parameter generating unit 53.

The scene change detection unit 50, the register 52 and the parameter generating unit 53 are described and stated as the foregoing. The weight unit 71 is used for providing the first weight and second weight. The calculating unit 71 is used for calculating a display parameter of the current frame. In this embodiment, the calculating unit 71 calculates the display parameter of the current frame as P3=(P1*W1+P2*W2)/(W1+W2), where, the display parameter of the current frame denotes P3, the second weight denotes W2, the first weight denotes W1, the original parameter of the current frame denotes P1, and the display parameter of the previous frame denotes P2.

Accordingly, the embodiments provide a method and an apparatus for adjusting a display parameter to compensate the scene change, and the weights for the original parameter of the current frame and the display parameter of the previous frame are dynamic adjusted. Thus these adaptive weights can be used for compensating the fast-varying and slow-varying scene changes. Finally, the LCD display which uses the apparatus and method provided by the invention will have smoother frames, so as to provide high display quality for TV or movie watchers and other customers.

It will be apparent to those skilled in the art that various modifications and variations can be made to the method of the present invention without departing from the scope or spirit of the invention. In view of the foregoing descriptions, it is intended that the present invention covers modifications and variations of this invention if they fall within the scope of the following claims and their equivalents.

What is claimed is:

1. A method for adjusting a display parameter in a display apparatus with scene change detection function, the method comprising:

calculating a scene change value between a current frame and a previous frame;

setting a first weight according to the scene change value;

calculating an original parameter of the current frame;

providing a display parameter of the previous frame; and calculating a display parameter of the current frame according to the first weight, the original parameter, and the display parameter of the previous frame, thereby the display parameter of the display apparatus is adjusted accordingly.

2. The method for adjusting a display parameter as claimed in claim 1, wherein the step of setting the first weight comprises:

setting an order;

providing a look-up table, wherein the look-up table records a relationship between the scene change value and the first weight; and accessing the look-up table to acquire the first weight corresponding to the scene change value.

3. The method for adjusting a display parameter as claimed in claim 2, wherein the step of calculating the display parameter of the current frame comprises:

subtracting the first weight from the order to acquire a second weight; and calculating P3=(P1*W1+P2*W2)/DL to acquire the display parameter P3 of the current frame, where W1 denotes the first weight, W2 denotes the second weight, P1 denotes the original parameter, P2 denotes the display parameter of the previous frame, and DL denotes the order.

4. The method for adjusting a display parameter as claimed in claim 1, further comprising:

setting a second weight according to the scene change value;

wherein the step of calculating the display parameter of the current frame comprises:

calculating P3=(P1*W1+P2*W2)/(W1+W2) to acquire the display parameter P3 of the current frame, where W1 denotes the first weight, W2 denotes the second weight, P1 denotes the original parameter, and P2 denotes the display parameter of the previous frame.

5. The method for adjusting a display parameter as claimed in claim 1, wherein the step of calculating the scene change value comprises:

calculating a characteristic value of the current frame;

calculating a characteristic value of the previous frame; and subtracting the characteristic value of the previous frame from the characteristic value of the current frame to acquire the scene change value.

6. The method for adjusting a display parameter as claimed in claim 5, wherein the characteristic value of the current frame is an average value of all pixel data of the current frame, and the characteristic value of the previous frame is an average value of all pixel data of the previous frame.

7. The method for adjusting a display parameter as claimed in claim 1, wherein the display parameter of the current frame comprises an image brightness parameter.

8. The method for adjusting a display parameter as claimed in claim 1, wherein the display parameter of the current frame comprises a brightness gain parameter of dynamic backlight control.

9. An apparatus for adjusting a display parameter, comprising:

a scene change detection unit, for calculating a scene change value between a current frame and a previous frame;

a weight unit, coupled to the scene change detection unit, for setting a first weight according to the scene change value;

a parameter generating unit, for calculating an original parameter of the current frame;

a register, for recording a display parameter of the previous frame; and a calculating unit, coupled to the weight unit, the register and the parameter generating unit, for calculating a display parameter of the current frame according to the first weight, the original parameter, and the display parameter of the previous frame.

10. The apparatus for adjusting a display parameter as claimed in claim 9, wherein the weight unit has a look-up table recording a relationship between the scene change value and the first weight, and the weight unit acquires the first weight corresponding to the scene change value by accessing the look-up table.

11. The apparatus for adjusting a display parameter as claimed in claim 9, wherein the calculating unit subtracts the first weight from a preset order to acquire a second weight; and calculates P3=(P1*W1+P2*W2)/DL to acquire the display parameter P3 of the current frame, where W1 denotes the first weight, W2 denotes the second weight, P1 denotes the original parameter, P2 denotes the display parameter of the previous frame, and DL denotes the order.

12. The apparatus for adjusting a display parameter as claimed in claim 9, wherein the weight unit has a look-up table; the weight unit acquires the first weight and a second weight corresponding to the scene change value by accessing the look-up table; the calculating unit calculates P3=(P1*W1+P2*W2)/(W1+W2) to acquire the display parameter P3 of the current frame, where W1 denotes the first weight, W2 denotes the second weight, P1 denotes the original parameter, and P2 denotes the display parameter of the previous frame.

13. The apparatus for adjusting a display parameter as claimed in claim 9, wherein the scene change detection unit calculates a characteristic value of the current frame; calculates a characteristic value of the previous frame; and subtracting the characteristic value of the previous frame from the characteristic value of the current frame to acquire the scene change value.

14. The apparatus for adjusting a display parameter as claimed in claim 13, wherein the characteristic value of the current frame is an average value of all pixel data of the current frame; and the characteristic value of the previous frame is an average value of all pixel data of the previous frame.

15. The apparatus for adjusting a display parameter as claimed in claim 9, wherein the display parameter of the current frame calculated by the parameter generating unit comprises an image brightness parameter.

16. The apparatus for adjusting a display parameter as claimed in claim 9, wherein the display parameter of the current frame calculated by the parameter generating unit comprises a brightness gain parameter of dynamic backlight control.

* * * * *